United States Patent [19]

Zizan

[11] Patent Number: 4,524,937
[45] Date of Patent: Jun. 25, 1985

[54] BUCKLE CONNECTION FOR HANGING CABLE

[75] Inventor: John P. Zizan, Pittsburgh, Pa.

[73] Assignee: Robroy Industries, Verona, Pa.

[21] Appl. No.: 459,310

[22] Filed: Jan. 20, 1983

[51] Int. Cl.$^3$ .............................................. F16L 3/08
[52] U.S. Cl. ..................................... 248/74.3; 248/62
[58] Field of Search .................. 248/58, 62, 72, 73, 248/74.1, 74.5, 340; 24/16 PB

[56] References Cited

U.S. PATENT DOCUMENTS

| | | | |
|---|---|---|---|
| 3,145,962 | 8/1964 | Kindorf | 248/68 |
| 3,226,069 | 12/1965 | Clarke | 248/73 |
| 3,486,726 | 12/1969 | Kindorf et al. | 248/72 |
| 3,547,385 | 12/1970 | Kindorf et al. | 248/62 |
| 3,650,499 | 3/1972 | Biggane | 248/62 |
| 3,651,546 | 3/1972 | Hartmann | 248/58 |
| 4,119,285 | 10/1978 | Bisping et al. | 248/73 |
| 4,377,879 | 3/1983 | Christo | 248/74.1 |
| 4,379,537 | 4/1983 | Perrault et al. | 411/136 |
| 4,417,711 | 11/1983 | Mades | 411/379 |

FOREIGN PATENT DOCUMENTS 986303 3/1976 Canada ................................ 248/340

OTHER PUBLICATIONS

Heyco ® Nytyes Nylon Cable Ties; pp. 19 & 20, no date available.

Primary Examiner—William H. Schultz
Assistant Examiner—Ramon O. Ramirez
Attorney, Agent, or Firm—Stanley J. Price, Jr.

[57] ABSTRACT

A conduit support includes a longitudinally extending channel-shaped member having a pair of spaced apart side walls. The side walls have free end portions turned inwardly to form opposed flanges that extend the length of the conduit support. A rigid buckle-like member is positioned within the conduit support so as to bridge the opposed flanges. The rigid member is supported by the flanges for slidable movement to a selected position along the length of the channel support. The rigid member includes a body portion having a plurality of fingers forming a first slot and a second slot extending through the body portion and spaced from one another. Each slot includes an open end portion and a closed end portion, thereby forming parallel, spaced apart arms connected by a bridge section. A flexible locking strip or cable tie of a preselected length extends upwardly through one of the slots across one of the arms and through the other slot and into surrounding relation with a cable. The free ends of the band are locked together to secure the cable to the structural support.

12 Claims, 9 Drawing Figures

BUCKLE CONNECTION FOR HANGING CABLE

BACKGROUND OF THE INVENTION

1. Field of the Invention

This invention relates to conduit support structure and more particularly to a combination locking strip and buckle for securing one or more cables to a structural support in a manner permitting the cable to be secured in a selective position along the length of the structural support.

2. Description of the Prior Art

It is well known to use interlocking clamp plates in suspending electrical cable, pipes, conduits and the like from a channel-shaped support member. Generally the clamp plates are curved to form a seat for the cable. The clamp plates are notched at one end to form a shoulder engageable with the flange of the channel member, and the opposite ends of the plates are bolted together so as to securely grip the cables. Examples of this type of cable hanger are disclosed in U.S. Pat. Nos. 3,145,962; 3,522,921; 3,532,311; 3,547,385; and 3,650,499.

The recognized disadvantage of the above described cable hanger is that the clamp plates are connected by threaded members and the like which are subject to damage when exposed to a corrosive environment. Corrosive damage to the metallic clamp plates and the threaded connection of a bolt to the plates can prevent effective reuse of the conduit hanger and substantially weaken the structural strength of the clamp plates. Also, if the threaded connection of the bolt to the plates becomes so corroded that it freezes the connection, movement of the cable hanger on the channel shaped support member for selective positioning of the cable can be substantially prevented.

As an alternative to the metallic clamping plates for securing cables to a channel member, it is known to use flexible bands to secure cables, such as pipes or conduits, to a channel member as illustrated in U.S. Pat. No. 3,633,857. One of the primary advantages of this type of cable connecting device is the use of flexible bands which are non-metallic and are not subject to corrosion. The bands are easily adjustable to accommodate a plurality of cables. The bands extend through spaced slots provided in the base portion of a channel member to secure the conduits in a selected position on the channel member. U.S. Pat. No. 3,677,339 discloses a tube bank arrangement in which a plurality of tube coils is connected to a spacer bar by U-shaped tube clips which are retained in grooves of the spacer bar. Locking strips engage the tongues of the tube clips to retain the coils in the tube clips and secured to the spacer bar.

It is also well known to utilize nylon cable ties for securing together a plurality of cables, wires, hoses and the like. The nylon ties are particularly adaptable in corrosive environments because they are chemically resistant to solvents, alkalies, acids, oils and greases. Another device that is commercially available for gathering and directing single or groups of cables is a plastic cable holder having a gate for facilitating cable entry and preventing unintentional cable exit. The cable holder is adaptable for connection to a mounting panel. However, the above described cable ties and cable holders are not readily adaptable alone for securing cables and the like to a channel-shaped member.

Therefore, there is need for a cable hanger that is resistant to damage in a corrosive environment and sufficiently adaptable for securing cables and the like to a channel-shaped member where the hanger is easily assembled and disassembled and adjustable for selective positioning of the cables on the channel-shaped member.

SUMMARY OF THE INVENTION

In accordance with the present invention, there is provided a cable support structure that includes a longitudinally extending channel-shaped support member. The support member includes a pair of spaced apart side walls having free end portions turned inwardly to form opposed, longitudinally extending flanges. A rigid member is positioned within the support member and is supported by the flanges. The rigid member has a body portion extending between the flanges. The body portion includes an aperture therethrough. Locking strip means extend from the rigid member through the aperture and is adapted to extend around a cable for securing the cable to the support member.

Further in accordance with the present invention there is provided a strap buckle that includes a body portion and a first slot extending to the body portion. A second slot extends to the body portion and is spaced from the first slot. The first and second slots each include an open end portion and a closed end portion. The body portion includes a plurality of spaced apart arms and a bridge section which connects the arms adjacent the closed end portions of the slots. The first slot is positioned between a first arm and a second arm. The second slot is positioned between the second arm and a third arm. The first and second slots are adapted to receive a banding strap that is slidable through the slot open end portions to a position adjacent the closed end portions and extends across the second arm. The second arm includes locking means for retaining the banding strap in the slots adjacent to the closed end portions.

The strap buckle is readily adaptable for insertion into the channel of the support member and positioning on the flanges for slidable movement to the desired position for securing one or more cables to the support member. The position of the buckle on the flanges is selective for orienting the first and second slots in a position to secure the cable or cables to the support member in a position oriented preferably 90° relative to the support member.

Accordingly, the principal object of the present invention is to provide a cable support structure that is adaptable for securing one or more cables to a U-shaped channel or cable tray in a manner that facilitates selective positioning of the cables on the channel or cable tray and is resistant to damage due to exposure to a corrosive environment.

A further object of the present invention is to provide a strap buckle for securing one or more cables by a banding strap to a supporting structure, such as a channel-shaped support, where one or more cables can be secured at any point along the length of the channel and the cables easily engaged and disengaged from connection to the channel.

Another object of the present invention is to provide a strap buckle having a pair of slots with locking means to receive a banding strap for securing a plurality of conduits, cables, pipes and the like to a support structure in a manner that facilitates selective positioning and installation of the cables to the support structure.

These and other objects of the present invention will be more completely disclosed and described in the following specification, the accompanying drawings and the appended claims.

DESCRIPTION OF THE PREFERRED EMBODIMENTS

Figure 1:
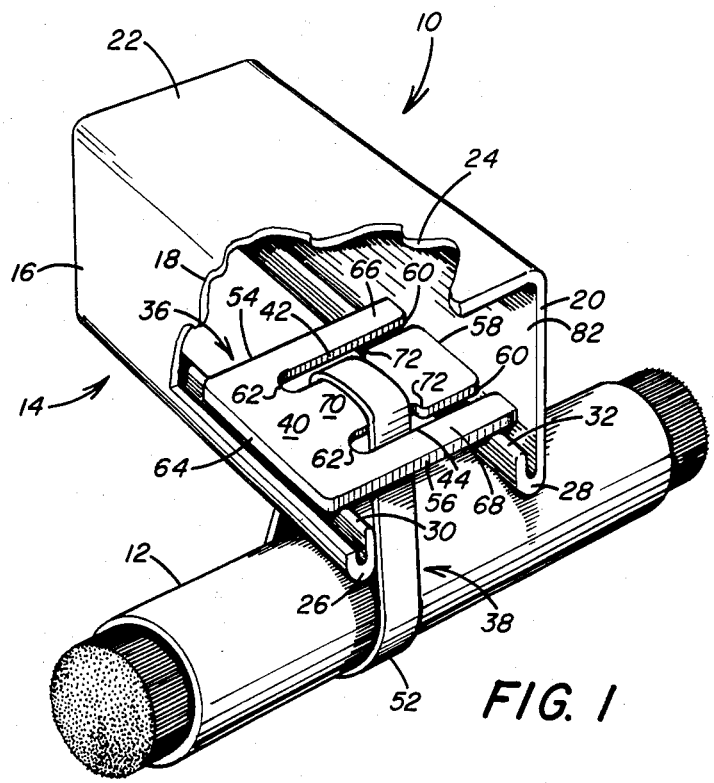
FIG. 1 is a fragmentary, isometric view of a cable hanger connected to a channel-shaped support member, illustrating a slotted buckle positioned in the support member on the flanges thereof and a strap connected to the buckle and wrapped around a cable for securing the cable to the support member.

Referring to the drawings and particularly to FIG. 1, there is illustrated a cable hanger generally designated by the numeral 10 for securing an electrical cable 12 or conduit, pipe or the like, to a structural support member generally designated by the numeral 14 which may include a cable tray as well known in the art or a U-shaped channel member 16 as illustrated in FIG. 1. In a well known manner, the channel member 16 is suitably suspended from a ceiling or an overhead structure (not shown) to support conduits, pipes, cables, or the like. For purposes of clarity of illustration, the channel member 16 is shown in FIG. 1, as positioned in overlying relation with the cable 12. However, the preferred arrangement is to secure the cable 12 in overlying relation with the channel member 16. It should be understood that the cable 12 can be secured to the channel member 16 in accordance with the present invention in a manner where the cable 12 is vertically positioned or may be in any other position as determined by the position of the channel member 16.

Figure 5:
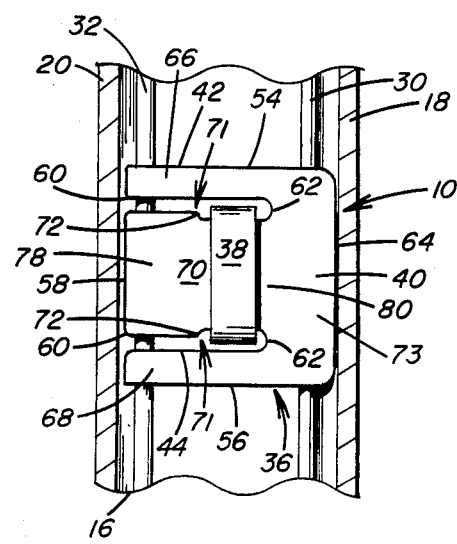
FIG. 5 is an enlarged, fragmentary, sectional view of the buckle on the flanges of the support member and the strap retained in the slots of the buckle.
Figure 6:
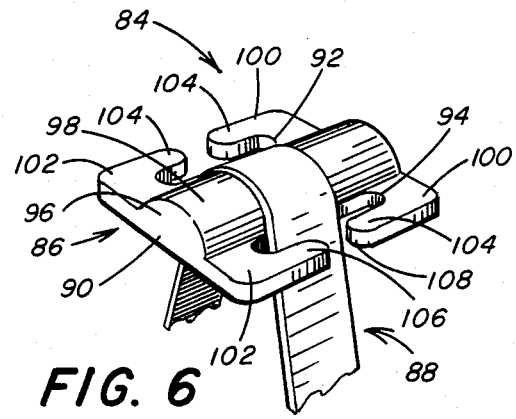
FIG. 6 is an isometric view of another embodiment of the buckle, illustrating an arcuate bearing surface for receiving the strap.

The channel member 16, illustrated in FIG. 1 and in section in FIG. 5, includes a pair of spaced apart side walls 18 and 20 connected by a top wall 22, thereby forming a U-shaped channel 24 of a preselected length. The side walls 18 and 20 include free end portions 26 and 28 that are turned inwardly to form longitudinal flanges 30 and 32, respectively. The flanges 30 and 32 are spaced laterally from the side walls 18 and 20 within the channel 24.

Figure 4:
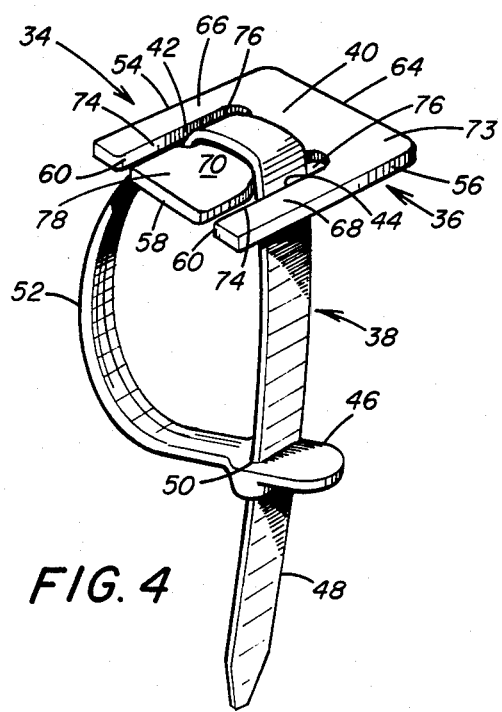
FIG. 4 is an isometric view of the buckle with a strap woven through the slots of the buckle and the ends of the strap engaged to one another to form a loop through which a cable extends in the manner illustrated in FIG. 1.

The channel member 16 is adapted to receive and support a strap buckle generally designated by the numeral 34 in FIG. 4. The strap buckle 34 includes the combination of a buckle generally designated by the numeral 36 and a strap or locking strip generally designated by the numeral 38 in FIGS. 1 and 4. The buckle 36 is a rigid member having a body portion 40 preferably fabricated of a non-metallic and non-corrosive material, making the buckle 36 adaptable for use in a corrosive environment. For those uses in which the buckle 36 is not exposed to a corrosive atmosphere, the body portion 40 may be fabricated of metal. Similarly, the channel member 16 is fabricated of a non-metallic material and preferably a non-conductive material.

The buckle body portion 40 is provided with a pair of slots 42 and 44 through which the locking strip 38 extends. The locking strip 38 includes a pair of free end portions 46 and 48 which are adapted for locking engagement in a well known manner. For example, as illustrated in FIG. 4, the free end portion 46 is provided with a locking slot 50 through which the end portion 48 extends, and by adjusting the length of the portion 48 that extends through the slot 50, the size of a loop 52 formed by the strip 38 is adjustable to accomodate the diameter of the cable 12 or cables which are secured by the strap buckle 34 to the channel member 16. The strip end portion 48 is securely locked within the slot 50 in a well known manner once the cable 12 is engaged by the strip 38, and the strip 38 is tensioned to draw the cable 12 into abutting engagement with the channel member end portions 26 and 28.

Figure 2:
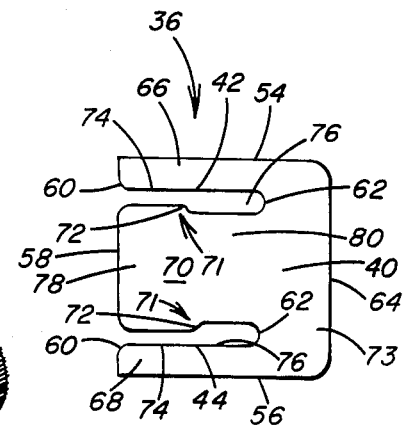
FIG. 2 is a top plan view of the buckle shown in FIG. 1, illustrating the configuration of the slots in the buckle for receiving and retaining a strap therein.
Figure 3:
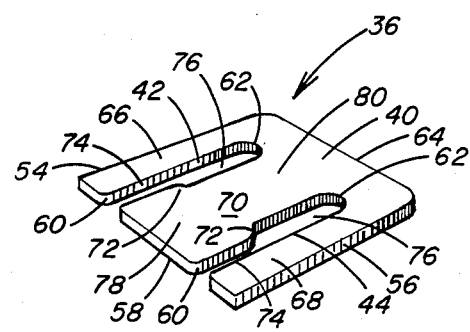
FIG. 3 is an isometric view of the buckle shown in FIG. 2, illustrating the open and closed ends of each of the slots of the buckle.

Referring to FIGS. 2 and 3, the buckle 36 is illustrated in detail. The body portion 40 of the buckle 36 is substantially planar and has a preselected thickness to permit efficient insertion and removal of the buckle 36 within the channel 24 of the channel member 16. FIGS. 6-9 illustrate another embodiment of buckle having an arcuate body portion for reducing abrasion of the strap, as will be explained later in greater detail. It should be understood that the buckle 36 may be shaped in a variety of configurations adapted to facilitate ease of insertion and positioning of the buckle 36 on the channel member flanges 30 and 32.

The buckle 36 is preferably fabricated of a non-metallic, non-conductive material and can be molded or otherwise fabricated from a selected material. It should also be understood that the buckle 36 may be fabricated of metal for use in non-corrosive environments. Also the buckle 36, if fabricated of metal, can be coated with a moisture resistant, polymeric material, such as polyvinylchloride (PVC), impact resistant nylon, polypropylene, polyurethane or polyethylene.

As illustrated in detail in FIGS. 2 and 3, the first and second slots 42 and 44 are positioned in spaced parallel relation to longitudinal edges 54 and 56 of the buckle body portion 40. The slots 42 and 44 extend a preselected distance from a side edge 58 into the body portion 40 so that each slot 42 and 44 includes an open end portion 60 at side edge 58 and a closed end portion 62 spaced from an opposite side edge 64. Preferably the side edge 64 is parallel to the side edge 58.

The first slot 42 and the longitudinal edge 54 form a first arm 66 of the buckle 36, and similarly the second slot 44 and the longitudinal edge 56 form a second arm 68 of the buckle 36 with a third or intermediate arm 70 positioned between arms 66 and 68. Preferably the arms 66, 68 and 70 extend in spaced parallel relation to one another and are connected to each other adjacent the slot closed end portions 62 by a bridge section 73. The slots 42 and 44 are spaced a distance apart to provide the arm 70 with a width greater than the width of arms 66 and 68. The arm 70 forms a bearing surface for supporting the strap 38, as illustrated in FIGS. 1, 4 and 5.

Preferably the arm 70 has a tensile strength exceeding the tensile strength of the strap 38.

As illustrated in FIGS. 2, 3 and 5, the first and second slots 42 and 44 have a configuration adapted to receive the strap 38 slidably through the open end portions 60 to a position adjacent the closed end portions 62 so that the strap 38 is securely retained in the slots 42 and 44 and extends across the arm 70. Preferably to retain the strap 38 in the first and second slots 42 and 44 adjacent the slot closed end portions 62 each slot is provided with a locking means generally designated by the numeral 71 in FIGS. 2 and 5. In a specific embodiment the locking means 71 includes locking tabs 72 provided on opposite sides of the arm 70. The locking tabs 72 form a constricted opening for the passage of the strap 38 from the slot open end portions 60 to the closed end portions 62. The tabs 72 provide each slot 42 and 44 with a slot reduced portion 74 of a length extending from the respective slot open end portion 60 to the locking tab 72. A slot enlarged portion 76 extends from the locking tab 72 to the closed end portion 62 of each slot.

The feature of the locking tabs 72 also provides the arm 70 with an enlarged end portion 76 adjacent to the slot open end portions 60 and a reduced end portion 80 adjacent to the slot closed end portion 62. Thus the locking means 71 retains the strap 38 in the slot enlarged portions 76 while permitting efficient insertion and removal of the strap 38 through the slot open end portions 60 and the reduced portions 74. This arrangement obviates the need for threading the strap 38 through the slots 42 and 44 which would be required if the slots were completely closed and did not include the open end portions 60. However, with the present invention, the slots 42 and 44 are open. Even though the tabs 72 ensure retention of the strap 38 in the slots 42 and 44, the slots 42 and 44, in another embodiment, can be constructed without the tabs 72. In this embodiment, the slots 42 and 44 have a uniform width from the open end portions 60 to the closed end portions 62, and thus do not include the separate slot portions 74 and 76.

The retention of the strap 38 by the locking tabs 72 in the slots 42 and 44 of the buckle 36 is clearly illustrated in FIG. 4 for the looped strap 38. In one method of operation, the strap 38 may be inserted into the slots 42 and 44 through the slot open end portion 60 and thereafter the free end portions 46 and 48 connected together in the manner illustrated in FIG. 4. In another method of operation, the strap 38 free end portions 46 and 48 are connected together to form the loop 52 before the strap 38 is inserted in the slots 42 and 44. Then the looped strap 38 is inserted into the buckle slots 42 and 44 so that a portion of the strap 38 extends across the arm 70 and then downwardly through the slots 42 and 44.

Preferably the strap or locking strip 38 is inserted in slots 42 and 44 of the buckle 36 before the buckle 36 is positioned in the channel 24 of channel member 16. The buckle 36 may be inserted in the channel member 16 either with the free end portions 46 and 48 of the strap 38 connected to form the loop 52 as illustrated in FIG. 4, or with the free end portions 46 and 48 not connected. In one method, the cable 12 is initially held in position against the channel member 16 below the flanges 30 and 32, and then with the buckle 36 positioned in the channel 24 the free end portions 46 and 48 are wrapped around the cable 12 and connected in the manner illustrated in FIG. 4.

In another method, the loop 52 is formed as illustrated in FIG. 4, and then the loop 52 is positioned around the cable 12. Thereafter, the cable 12 with the buckle 34 therearound is held in position adjacent the channel member 16 for positioning of the buckle 36 in the channel 24. Once the cable 12 is in position below the channel member 16 and the buckle 36 in the channel 24, the strap end portions 46 and 48 are tensioned to reduce the size of the loop 52 so that the cable 12 is held in contact with the side wall edges 26 and 28 of the channel member 16 below the flanges 30 and 32, as illustrated in FIG. 1.

The combination of the buckle 36 and the strap 38 to secure the cable 12 to the channel member 16 facilitates efficient insertion of the buckle 36 at any point along the length of the channel member 16. Accordingly, this permits the cable 12 to be secured to the channel member 16 at any point along the length of the channel member 16. Preferably, the buckle 36 is positioned in the channel 24 on the flanges 30 and 32 as illustrated in FIGS. 1 and 5.

The buckle 36 can be inserted in the channel 24 in one method by passing the buckle 36 with the strap 38 secured thereto through an open end portion 82 of the channel member 16. The buckle 36 is advanced in a substantially horizontal position through the open end portion 82 with the slots 42 and 44 extending transversely between the flanges 30 and 32. Once the buckle 36 is advanced to a selected point in the channel 24, the buckle 36 is lowered onto the flanges 30 and 32 so that the buckle side edge 58 overlies flange 32 and the opposite buckle side edge 64 overlies the flange 30. Accordingly, with the buckle 36 in this position the side edges 54 and 56 and the arms 66 and 68 span or bridge the channel 24 between the flanges 30 and 32.

The slot open end portions 60 are closed off by the channel member flange 32. This serves to further retain the strap 38 in the slots 42 and 44. Then the cable 12 is either extended through the loop 52 formed in the strap 38 or the strap ends 46 and 48 are looped around the cable 12 and connected to each other. Then the end portion 48 is drawn through the slot 50 in end portion 46 to reduce the size of the loop 52 to draw the cable 12 into secure abutting relation with the bottom channel member 16. With this arrangement, the cable 12 is secured to the channel member 16 to extend at a right angle relative to the longitudinal axis of the channel member 16.

The buckle slots 42 and 44 can be provided with sufficient length to retain a plurality of straps 38 in side-by-side relation for encircling the conduit 12 as compared to the use of a single strap 38, as illustrated in FIG. 1. This arrangement is particularly adapted to securing heavier cables 12 to the channel member 16. To this end, the width of the strap 38 may be selected to accommodate a plurality of straps in the buckle slots 42 and 44. Accordingly, the widths of the slot reduced portions 74 and enlarged portions 76 can be selectively dimensioned to accommodate a variety of strap sizes.

Not only can the buckle 36 be inserted through the open end portions 82 of the channel member 16, it can also be introduced upwardly into the channel 24 at any point along the length of the channel 24 between the opposite open end portions 82 of the channel member 16. To accomplish this manner of insertion of the buckle 36 into the channel 24, the buckle 36 is positioned on edge in a substantially vertical position and inserted upwardly into the channel 24 to a position above the flanges 30 and 32. The buckle 36 is then lowered in a horizontal position onto the flanges 30 and 32.

Now referring to FIGS. 6-9, there is illustrated another embodiment of the strap buckle generally designated by the numeral 84 that includes a buckle 86 and a strap 88 equivalent to the strap 38 above described. The buckle 86, similar to the buckle 36, is a rigid member having a body portion 90 preferably fabricated of a non-metallic and non-corrosive material. The buckle body portion 90 includes a pair of slots 92 and 94 through which the strap 88 extends. The slots 92 and 94 are spaced from one another by a bridge section 96 of the body portion 96. The bridge section 96 has an arcuate surface 98 that forms a bearing surface for receiving and supporting the strap 88. The bridge section 96 extends parallel to the slots 92 and 94 so that the strap 88 extends from the slots 92 and 94 into overlying relation with the bridge section 96.

Preferably, the surface 98 of the bridge section 96 has a preselected radius extending upwardly from the slots 92 and 94 to provide on the buckle body portion 90 a strap bearing surface which is free of sharp corners. This arrangement reduces abrasion of the strap 88 by contact with the body portion 90 when the strap 88 is drawn tightly through the slots 92 and 94 and over the body portion 90. Thus, the provision of the arcuate bearing surface 98 permits increased tensioning of the strap 88 without weakening the strap 88 and increases the material strength of the buckle 86 because of the additional mass provided by the section 96.

With the embodiment of the nozzle 86 illustrated in FIGS. 6-9, each slot 92 and 94 is formed by a pair of arms 100 and 102 extending from the bridge section 96 and terminating in end portions 104 and 106 spaced a sufficient distance apart to form an opening 108 through which the strap 88 may be extended to position the strap 88 in the respective slot 92 and 94. Preferably, the width of the strap 88 is greater than the width of the opening 108. This arrangement requires twisting the strap 88 in order to pass the strap 88 on edge through the opening 108.

Figure 7:
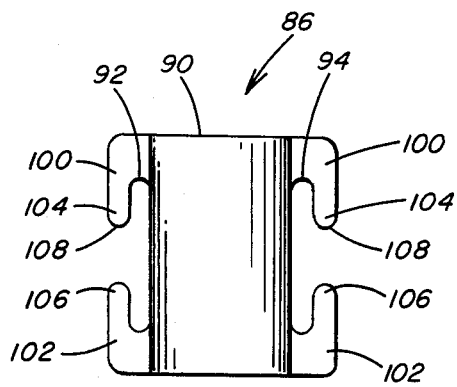
FIG. 7 is a top plan view of the buckle shown in FIG. 6.
Figure 8:
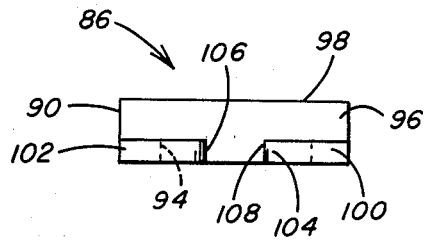
FIG. 8 is a side view of the buckle shown in FIG. 7.
Figure 9:
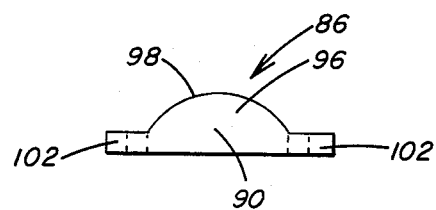
FIG. 9 is an end view of the buckle shown in FIG. 7.

The openings 108 into the slots 92 and 94 are illustrated in FIG. 7 as being centered on the slots and extending perpendicular to the longitudinal axis of the slots. However, it should be understood that each opening 108 may be selectively positioned at any point along the length of the respective slot and may extend angularly relative to the slot. Furthermore, the slots 92 and 94 may include suitable means, such as the tabs 72 described above for the buckle 36 illustrated in FIGS. 1-5, for retaining the strap 88 in the slots 92 and 94.

Thus, the strap buckles 34 and 84 provide efficient means for securing cables, conduits and the like to channel-shaped members without the use of mechanical connectors which are subject to failure or inoperability where exposed to a corrosive environment and are substantially more expensive to manufacture than the strap buckles 34 and 84. The buckles 36 and 86 and the straps 38 and 88 eliminate the need for conventional threaded and other mechanical connectors which are also subject to malfunction and require maintenance and/or replacement. The strap buckle of the present invention is easily inserted and removed from an operative position in a channel member and permits rapid installation and securement of a cable to the channel member. Preferably, the buckles 36 and 86 are fabricated to have a structural strength that exceeds the structural strength of the respective straps 38, and in particular, the intermediate arm 70 of the buckle 36 and the bridge section 96 of the buckle 86 are provided with a tensile strength greater than the tensile strength of the strap 38 and 88 so that straps will fail before the arm 70 and bridge section 96 fails.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Cable support structure comprising,
   a structural support including a longitudinally extending channel-shaped support member,
   said support member including a pair of spaced side walls having free end portions turned inwardly to form opposed, longitudinally extending flanges,
   locking strip means extending around a cable for securing the cable to said support member, said locking strip means including a first end portion and a second end portion,
   a rigid member positioned within said support member and supported by said flanges,
   said rigid member having a body portion extending between said flanges, said body portion including slotted means for receiving said locking strip means to extend around said rigid member in overlying relation with said rigid member body portion, and
   means associated with said locking strip means for connecting said first end portion to said second end portion to form a loop of a preselected size extending around said rigid member at a first end portion and around the cable at a second end portion to support the cable from said support member.

2. Cable support structure as set forth in claim 1 which includes,
   said rigid member body portion having a preselected width greater than the distance between said support member flanges,
   said body portion including a pair of opposed side edges adapted for positioning on said support member flanges, and
   said rigid member being movable on said support member flanges to a preselected position on said support member.

3. Cable support structure as set forth in claim 1 which includes,
   said slotted means including a slot in said rigid member body portion being adapted to receive and retain said locking strip means in said slot.

4. Cable support structure as set forth in claim 1 in which,
   said loop is placed under tension extending around said rigid member body portion and the cable to draw the cable into abutting engagement with said support member.

5. Cable support structure as set forth in claim 1 which includes,
   said loop first end portion being positioned between said support member side walls on said rigid member body portion,
   said loop second end portion being positioned below said support member and extending around the cable to hold the cable in abutting relation with said support member and perpendicular to the longitudinal axis of said support member, and said rigid member, locking strip means, and the cable being movable to a preselected position along the length of said support member.

6. Cable support structure as set forth in claim 1 in which,
said locking strip means includes a strap extending in said loop around said rigid member body portion and the cable, and
said strap extending downwardly from said support member to secure the cable to said support member in underlying abutting relation with said support member.

7. Cable support structure as set forth in claim 1 in which,
said locking strip includes a strap of flexible material extending at one end through said slotted means and around said rigid member and at an opposite end around the cable to suspend the cable from said support member,
said strap including said first and second end portions being secured together to form said loop around said rigid member and the cable, and
said looped strap being movable in said slotted means of said rigid member for selective positioning of said strap between said support member spaced side walls.

8. Cable support structure as set forth in claim 7 which includes,
a plurality of said straps positioned in side-by-side relation and extending in a looped configuration around said rigid member body portion and the cable to support the cable from said support member.

9. Cable support structure as set forth in claim 1 which includes,
means for tensioning said locking strip means around the cable to maintain the cable in abutting relation with said support member.

10. Cable support structure as set forth in claim 1 which includes,
said rigid member body portion slotted means having an open end portion and a closed end portion,
said locking strip means being positioned in said slotted means between said open and closed end portions, and
said rigid member being positioned on said support member flanges so that said slotted means open end portion overlies one of said flanges thereby closing said open end portion to prevent movement of said locking strip means out of said slotted means.

11. Cable support structure as set forth in claim 1 in which,
said rigid member is positioned between said side walls on said flanges to bridge said support member, and
said locking strip means extending perpendicularly downwardly from said rigid member and around the cable to hold the cable in a position perpendicular to the longitudinal axis of said support member.

12. Cable support structure as set forth in claim 1 in which,
said rigid member is positioned between said side walls on said flanges to bridge said support member, and
said locking strip means extending perpendicularly downwardly from said rigid member and around the cable to hold the cable in a preselected position relative to the longitudinal axis of said support member.

* * * * *